(12) United States Patent
Fujita et al.

(10) Patent No.: US 6,500,502 B1
(45) Date of Patent: Dec. 31, 2002

(54) LIQUID CRYSTAL COMPOSITION AND LIQUID CRYSTAL DISPLAY ELEMENT

(75) Inventors: Hiroaki Fujita, Chiba (JP); Katsuyuki Murashiro, Chiba (JP); Etsuo Nakagawa, Chiba (JP)

(73) Assignee: Chisso Corporation, Osaka (JP)

( * ) Notice: Subject to any disclaimer, the term of this patent is extended or adjusted under 35 U.S.C. 154(b) by 130 days.

(21) Appl. No.: 09/661,787

(22) Filed: Sep. 14, 2000

(30) Foreign Application Priority Data

Sep. 14, 1999 (JP) ............................. 11-260347

(51) Int. Cl.⁷ .................. C09K 19/30; C09K 19/20; C09K 19/12
(52) U.S. Cl. .............. 428/1.1; 252/299.63; 252/299.66; 252/299.67
(58) Field of Search ........................ 252/299.63, 299.66, 252/299.67; 428/1.1

(56) References Cited

U.S. PATENT DOCUMENTS 6,162,372 A * 12/2000 Tomi et al. ............... 252/299.6
6,214,256 B1 * 4/2001 Tomi et al. ............. 252/299.63

FOREIGN PATENT DOCUMENTS

| DE | 19943357 | 4/2000 |
| EP | 0786445 | 7/1997 |
| JP | 7-300582 | 11/1995 |
| JP | 7-300584 | 11/1995 |
| JP | 7-300585 | 11/1995 |
| JP | 10-204436 | 8/1998 |
| JP | 10-251186 | 9/1998 |

OTHER PUBLICATIONS

Derwent Abstract of WO 96/11897.
Derwent Abstract of WO 96/11995.
Derwent Abstract of WO 96/11994.

* cited by examiner

Primary Examiner—Shean C. Wu
(74) Attorney, Agent, or Firm—Wenderoth, Lind & Ponack, L.L.P.

(57) ABSTRACT

A liquid crystal composition having material properties for an STN mode, a low threshold voltage, a small temperature dependency thereat, a high stability to heat and ultraviolet rays, and a small frequency dependency of a dielectric anisotropy ($\Delta\epsilon$) at a low temperature. The liquid crystal composition comprises a first component of the formula (1), and a second component selected from the general formulas (2-1) to (2-4), without any liquid crystalline compound having a dielectric anisotropy value ($\Delta\epsilon$) of 5 or more and three or more six-membered rings, as another component:

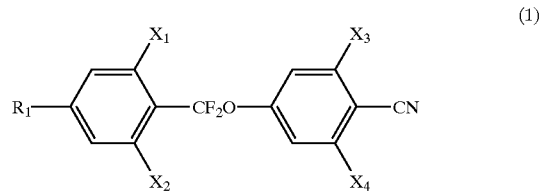

(1)

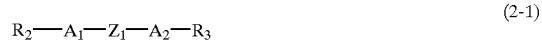

(2-1)

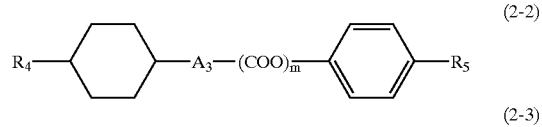

(2-2)

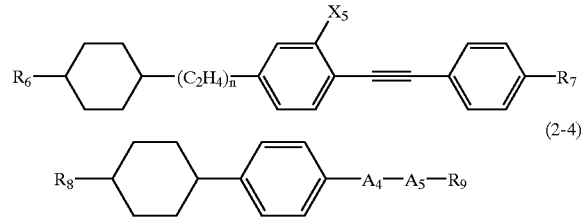

(2-3)

(2-4)

wherein $R_1$ to $R_8$, $A_1$ to $A_5$, $Z_1$, m, n and $X_1$ to $X_5$ are defined in the specification.

4 Claims, 1 Drawing Sheet

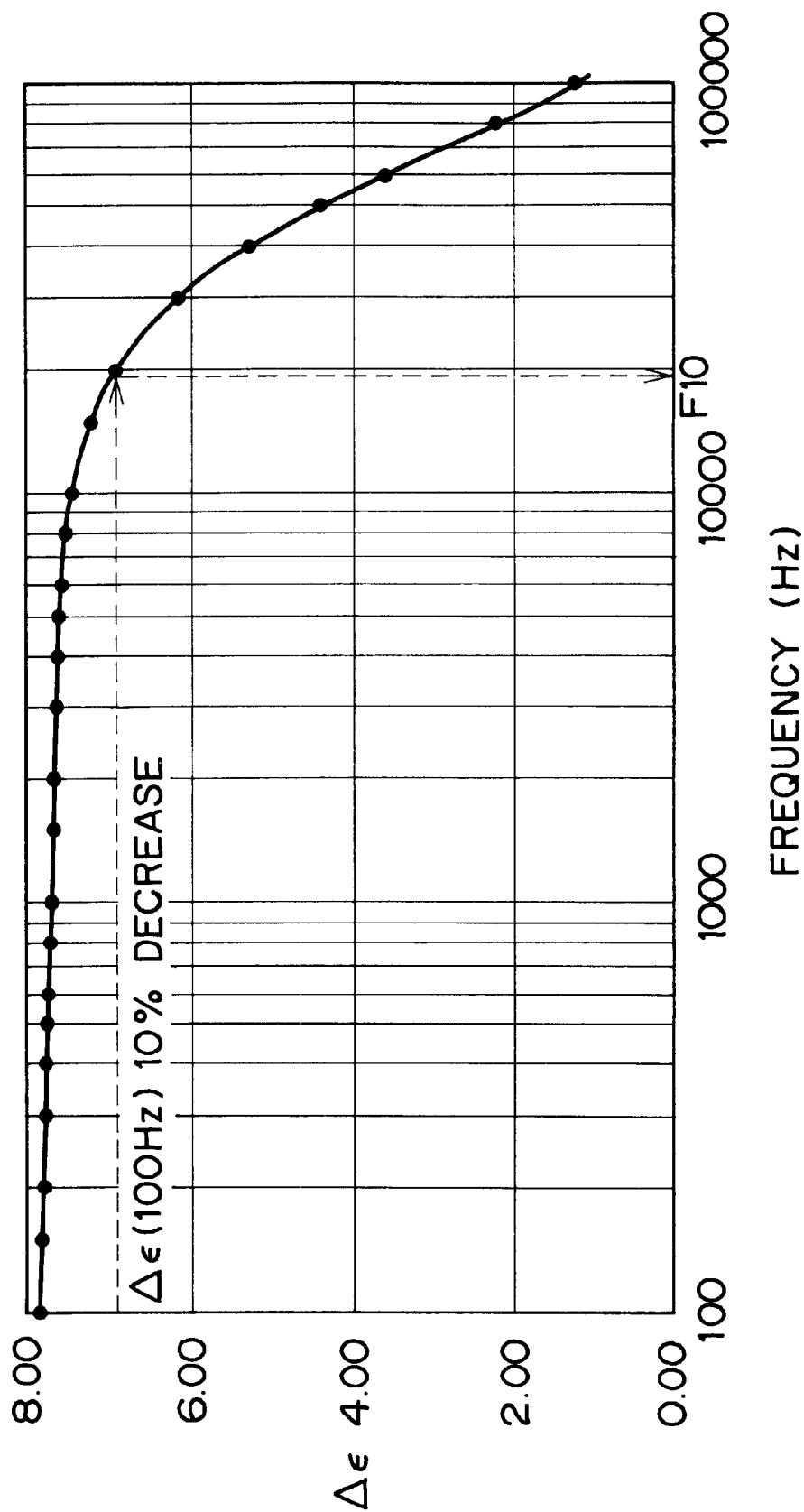

LIQUID CRYSTAL COMPOSITION AND LIQUID CRYSTAL DISPLAY ELEMENT

BACKGROUND OF THE INVENTION

1. Field of the Invention

The present invention relates to a nematic liquid crystal composition and a liquid crystal display element. More particularly, it relates to a liquid crystal composition suitably usable for a liquid crystal display element using a super twisted nematic (STN) display mode, and a liquid crystal display element using this liquid crystal composition.

2. Description of the Related Art

As liquid crystal display modes, there have been proposed a twisted nematic (TN) mode, a supertwisted nematic (STN) mode, an active matrix mode, etc., which have been practically utilized one after another. Among these modes, the STN mode proposed by T. J. Scheffer et al. [Appl. Phys. Lett., 45 (10), 1021 (1984)] wherein the alignment of liquid crystal molecules in the upper and lower substrates is twisted at an angle of 180° to 270° has been adopted in liquid crystal display elements for personal computers and the like.

In recent years, the STN mode has been also used in liquid crystal display elements for potable information terminals such as electric pocket notebooks and small size note type personal computers which are often used outdoors.

The general characteristics required for the STN mode have been the following paragraphs (1) to (4), but for a liquid crystal material usable for the STN mode of outdoor use, the following characteristics of the paragraphs (5), (6) and (7) are further required.

(1) To make a steepness ($\gamma$) in a voltage-transmittance curve (a V-T curve) of a liquid crystal composition close to 1 as much as possible, for the purpose of attaining a high contrast of a liquid crystal display element.

(2) To lower a viscosity ($\eta$) of the liquid crystal composition as much as possible, for the purpose of shortening a response time of the liquid crystal display element.

(3) To permit taking a suitable optical anisotropy ($\Delta n$) of the liquid crystal composition in accordance with a cell thickness of the liquid crystal display element, for the purpose of attaining an optimum contrast of the liquid crystal display element.

(4) To exhibit a nematic phase of liquid crystal composition within a wide temperature range, for the purpose of expanding a temperature range of an environment where the liquid crystal display element is used.

(5) To lower a threshold voltage ($V_{th}$) of the liquid crystal composition, and to reduce a temperature dependency ($\delta$) of the threshold voltage of the liquid crystal composition, for the purpose of reducing the size of a battery which is a power source for driving the liquid crystal display element.

(6) To exhibit a high stability of the liquid crystal composition to heat and ultraviolet rays, for the purpose of preventing the deterioration of the liquid crystal composition to semi-permanently maintain a display quality of the liquid crystal display element.

(7) To reduce a frequency dependency of a dielectric anisotropy ($\Delta\epsilon$) in a low temperature range, i.e., to exhibit a constant value of $\Delta\epsilon$ in a higher frequency range (a large value of $F_{10}$ which will be mentioned below), for the purpose of enabling the display at a low temperature range (−10° C. or lower).

As the liquid crystal compositions for use in the STN mode having a relatively low threshold voltage and a relatively good temperature property at the threshold voltage (i.e., a small temperature dependency), there are mentioned compositions described in Japanese Patent Application Laid-Open Nos. 300582/1995, 300585/1995, 300584/1995, etc.

These liquid crystal compositions disclosed therein, however, have a drawback that they are poor in the stability to heat and ultraviolet rays, as shown in comparative examples of the present application. In addition, WO 96/11897 aims to provide a novel liquid crystalline compound having a large dielectric anisotropy and a remarkably low viscosity as a liquid crystalline compound for a low voltage in the various modes including the active matrix mode and the STN mode, and a liquid crystal composition containing the same. Herein, there is disclosed a composition containing a compound having —$CF_2O$— as a bonding group and 3,5-difluoro-4-cyanophenyl as a terminal group (Composition Examples 19 to 22). Composition Example 19 disclosed herein is similar to the composition of the present invention, but as shown in the comparative example of the present application, it still has the drawbacks of a bad steepness, a high threshold voltage and a large temperature dependency at the threshold voltage.

As mentioned above, the various liquid crystal compositions have been investigated, but as for the liquid crystal composition for the STN display mode of the outdoor use, it is now required to satisfy the properties of the above paragraphs (5) and (6) in addition to the properties of the above paragraphs (1) to (4).

Furthermore, in the use for a mobile phone and the like, it is intended to perform a high duty for the purpose of expansion of displaying capacity. Accordingly, an actual driving frequency becomes higher and higher. As the driving frequency becomes higher, the movement of the liquid crystalline molecules at a low temperature cannot follow the change of the frequency of voltage, so that some serious problems rise, for example, a ghost phenomenon occurs, and the display is impossible owing to the decrease of contrast. In order to avoid such an insufficient display, there is more and more strongly required the liquid crystal material having an excellent frequency dependency (a small frequency dependency) of $\Delta\epsilon$ at a low temperature range mentioned in the above paragraph (7), i.e., the liquid crystal material capable of maintaining a constant value (of $\Delta\epsilon$) up to a higher frequency.

The specification of Japanese Patent Application Laid-Open No. 251186/1998 discloses, in Examples 46, 47 and 49, the liquid crystal compositions extremely similar to those of the present invention, but these compositions do not solve the problem of the present invention that a frequency dependency of $\Delta\epsilon$ in a low temperature range mentioned in the above (7) is to be improved as shown on the comparative example below.

SUMMARY OF THE INVENTION

The problem to be solved by the present invention is to provide a liquid crystal composition which satisfies general properties required for an STN mode and which especially has a low threshold voltage, a small temperature dependency thereat, a high stability to heat and ultraviolet rays, and a small frequency dependency of a dielectric anisotropy ($\Delta\epsilon$) at a low temperature.

The present inventors have extensively investigated compositions using various liquid crystalline compounds in order to solve the above problem, and as a result, it has been found that the problem can be solved by a composition comprising two specific components of a first component and a second component, and further excluding a specific component as another component therefrom. Thus, the present invention has now been achieved on the basis of the finding.

The liquid crystal compositions of the present invention will be described by the following paragraphs (1) to (4).

(1) A liquid crystal composition comprising:
a first component comprising a compound represented by the general formula (1), and
a second component comprising at least one compound selected from the group consisting of compounds represented by the general formulas (2-1), (2-2), (2-3) and (2-4), without any liquid crystalline compound having a dielectric anisotropy value ($\Delta\epsilon$) of 5 or more and three or more six-membered rings, as another component:

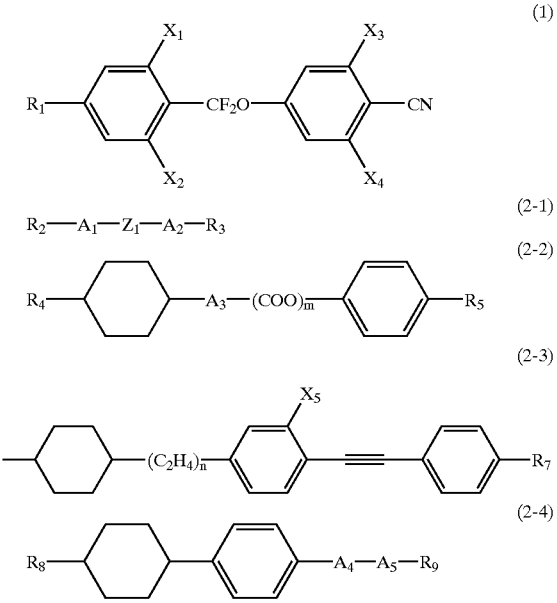

wherein $R_1$ represents an alkyl group of 1 to 10 carbon atoms in which one methylene group may be replaced by an oxygen atom or —CH=CH—; $R_2$, $R_3$ and $R_4$ each independently represent an alkyl group of 1 to 10 carbon atoms in which one methylene group may be replaced by an oxygen atom or —CH=CH— and one or more hydrogen atoms may be substituted by fluorine atoms; $R_5$ represents an alkyl group of 1 to 10 carbon atoms in which one methylene group may be replaced by an oxygen atom; $R_6$, $R_7$ and $R_9$ each independently represent an alkyl group of 1 to 10 carbon atoms; $R_8$ represents an alkyl group of 1 to 10 carbon atoms in which one methylene group may be replaced by an oxygen atom; $A_1$, $A_2$, $A_3$ and $A_5$ each independently represent a trans-1,4-cyclohexylene group or a 1,4-phenylene group; $A_4$ represents a 1,4-phenylene group or a 1,4-phenylene group substituted by one to four fluorine atoms; $Z_1$ represents —C≡C— or a single bond; m and n each independently represent an integer of 0 or 1; and $X_1$, $X_2$, $X_3$, $X_4$ and $X_5$ each independently represent a hydrogen atom or a fluorine atom.

(2) A liquid crystal composition according to the above-mentioned (1) wherein the contents of the said first component and the said second component are 5 to 50% and 10 to 85%, respectively, with respect to the total weight of the liquid crystal composition.

(3) A liquid crystal composition according to any one of the above-mentioned (1) and (2), which further contains a third component comprising a compound represented by the general formula (3)

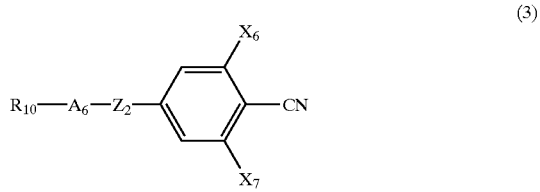

wherein $R_{10}$ represents an alkyl group of 1 to 10 carbon atoms in which one methylene group may be replaced by an oxygen atom or —CH=CH—; $A_6$ represents a trans-1,4-cyclohexylene group, a 1,4-phenylene group or a 1,4-phenylene group substituted by one to four fluorine atoms; $Z_2$ represents —COO—, —$C_2H_4$— or a single bond; and $X_6$ and $X_7$ each independently represent a hydrogen atom or a fluorine atom.

(4) A liquid crystal composition according to the above-mentioned (3), wherein the contents of the said first component, the said second component and the said third component are 5 to 50%, 10 to 85%, and 5 to 40%, respectively, with respect to the total weight of the liquid crystal composition.

A liquid crystal display element of the present invention is shown by the following paragraph (5).

(5) A liquid crystal display element comprising the liquid crystal composition according to any one of the above-mentioned paragraphs (1) to (4).

BRIEF DESCRIPTION OF THE DRAWING

FIG. 1 shows a frequency dependency of a dielectric anisotropy ($\Delta\epsilon$) at −20° C. in Example 1.

DETAILED DESCRIPTION OF THE INVENTION

The following will explain the present invention in detail.

Examples of preferable compounds which can be used as the first component constituting the liquid crystal composition of the present invention include compounds represented by the following general formulas (1-1) to (1-9).

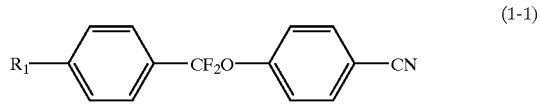

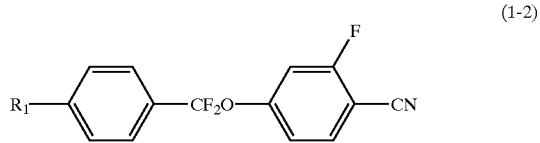

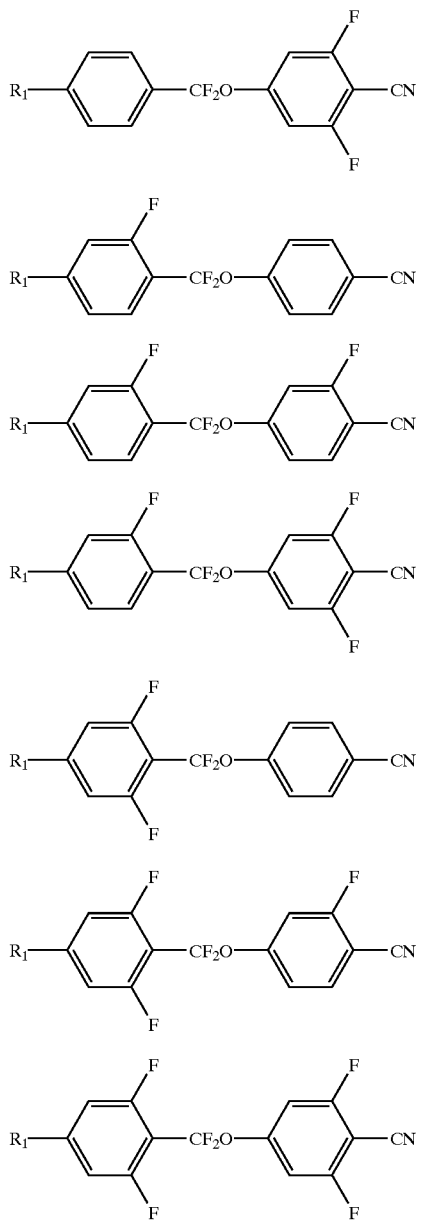

Among these formulas, $R_1$ is the same as described above, and it is preferably an alkyl group having 1 to 10 carbon atoms or an alkenyl group having 2 to 10 carbon atoms.

The following will explain compounds represented by the general formulas (2-1), (2-2), (2-3) and (2-4) which can be used as the second component constituting the liquid crystal composition of the present invention.

As the compound of the formula (2-1), preferred are those represented by the following formulas (2-1-1) to (2-1-4).

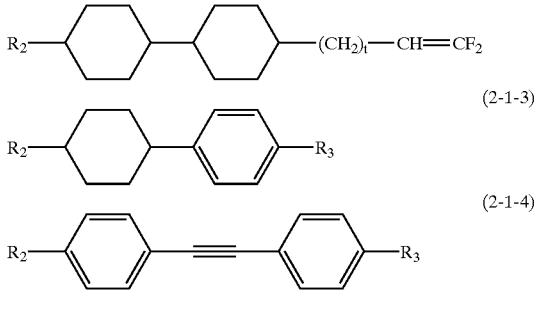

In these formulas, $R_2$ and $R_3$ are the same as described above, but preferably, $R_2$ is an alkyl group having 1 to 10 carbon atoms or an alkenyl group having 2 to 10 carbon atoms, $R_3$ is an alkyl group or alkoxy group having 1 to 10 carbon atoms, or an alkoxymethyl group or alkenyl group having 2 to 10 carbon atoms, and t is an integer of 0 to 8.

As the compound of the formula (2-2), preferred are those represented by the following formula (2-2-1) or (2-2-2).

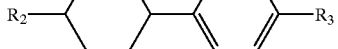

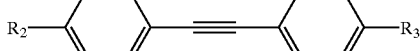

In these formulas, $R_4$ and $R_5$ are the same as described above, but preferably, $R_4$ is an alkyl group having 1 to 10 carbon atoms or an alkenyl group having 2 to 10 carbon atoms, $R_5$ is an alkyl group having 1 to 10 carbon atoms, an alkoxy group having 1 to 9 carbon atoms or an alkoxymethyl group having 2 to 9 carbon atoms, and t is an integer of 0 to 8.

As the compound of the formula (2-3), preferred are those represented by the following formula (2-3-1) or (2-3-2).

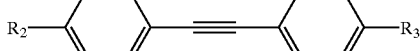

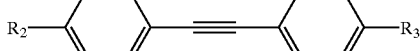

Among these formulas, $R_6$ and $R_7$ are the same as described above, but preferably, each of them is independently an alkyl group having 1 to 10 carbon atoms.

As the compound of the formula (2-4), preferred are those represented by the following formula (2-4-1) or (2-4-2).

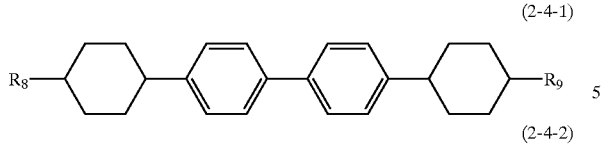

(2-4-1)

(2-4-2)

Among these formulas, $R_8$ and $R_9$ are the same as described above, but preferably, each of them is independently an alkyl group having 1 to 10 carbon atoms or an alkoxymethy group having 2 to 10 carbon atoms.

As the compound represented by the general formula (3) which is the third component constituting the liquid crystal composition of the present invention, preferred are those represented by the following formulas (3-1) to (3-11).

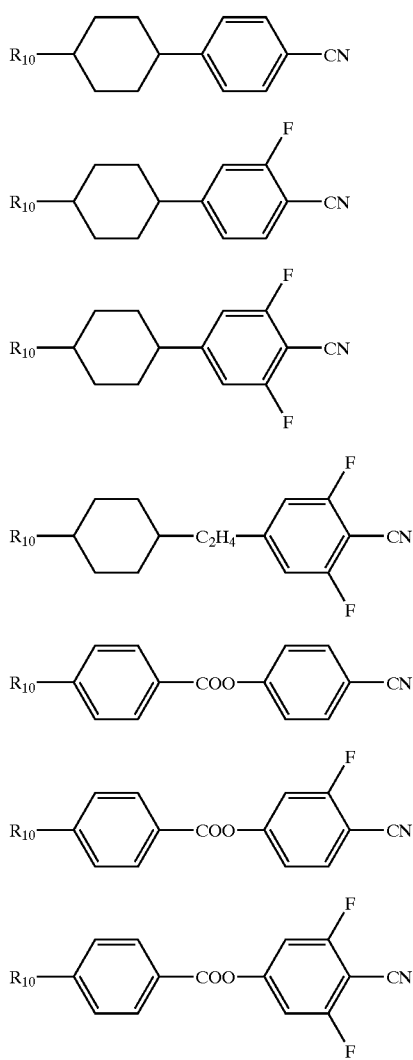

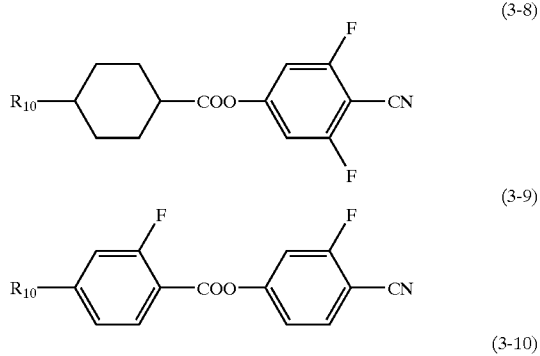

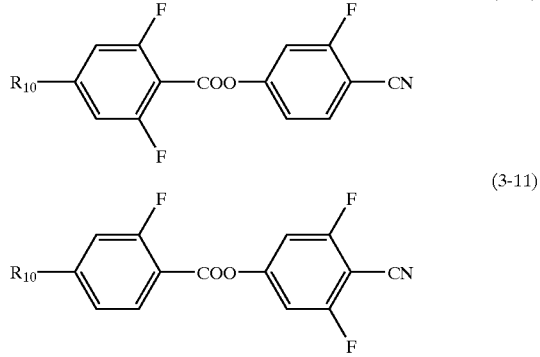

Among these formulas, $R_{10}$ is the same as described above, but preferably, $R_{10}$ is an alkyl group having 1 to 10 carbon atoms, an alkenyl group having 2 to 10 carbon atoms, or an alkoxymethy group having 2 to 10 carbon atoms.

The following will explain preferable component ratios of the compounds constituting the liquid crystal composition of the present invention and reasons therefor.

The content of the first component in the liquid crystal composition of the present invention is preferably in a range of 5 to 50% with respect to the total weight of the composition. When this content is less than 5%, it is sometimes difficult to attain the objects of the present invention, i.e., the maintenance of stability to heat or ultraviolet rays, a low threshold voltage, a small temperature dependency thereat, and an improvement effect of frequency dependency of $\Delta\epsilon$ in a low temperature range (a small frequency dependency) regarding the liquid crystal composition, and hence the above content is not preferred. Conversely when the content of the first component is more than 50%, some inconveniences rise, and for example, the viscosity of the liquid crystal composition increases, and a clearing point (an NI point) lowers on occasion.

The content of the second component in the liquid crystal composition of the present invention is preferably in a range of 10 to 85% with respect to the total weight of the composition. When the content is less than 10%, it is sometimes difficult to attain the object of the present invention that the viscosity of the liquid crystal composition is lowered as much as possible, and conversely, when the content is more than 85%, the threshold voltage of the liquid crystal composition inconveniently becomes high on occasion. Accordingly, the above contents are not preferred.

In the case that the third component is used in the composition of the present invention, the content of this component is preferably in a range of 5 to 40% with respect to the total weight of the composition. When the content is less than 5%, it is impossible to attain the object of the present invention that the threshold voltage of the liquid crystal composition is further lowered. Conversely, when the above content is more than 40%, the lower limit temperature of the nematic phase of the resulting liquid crystal composition inconveniently becomes high on occasion. Accordingly, the above contents are not preferred.

The liquid crystal composition of the present invention may contain a liquid crystalline compound component other than the above-mentioned first, second and third components, as required. In this case, however, it is an important feature that a liquid crystal compound having a dielectric anisotropy ($\Delta\epsilon$) of 5 or more and possessing three or more six-membered rings is excluded as another component.

When this specific liquid crystal compound is excluded as the other component, there can be particularly obtained an effect of improving the frequency dependency of the dielectric anisotropy ($\Delta\epsilon$) in a low temperature range, and characteristics of the present invention, which are obtained by the first component and the second component, or the first component, the second component and the third component, such as the low threshold voltage, the small temperature dependency thereat and the low viscosity ($\eta$) can be maintained (exhibited).

Typical examples of the liquid crystal compound having a dielectric anisotropy ($\Delta\epsilon$) of 5 or more and possessing three or more six-membered rings which is required to be excluded from the liquid crystal composition of the present invention include the following compounds.

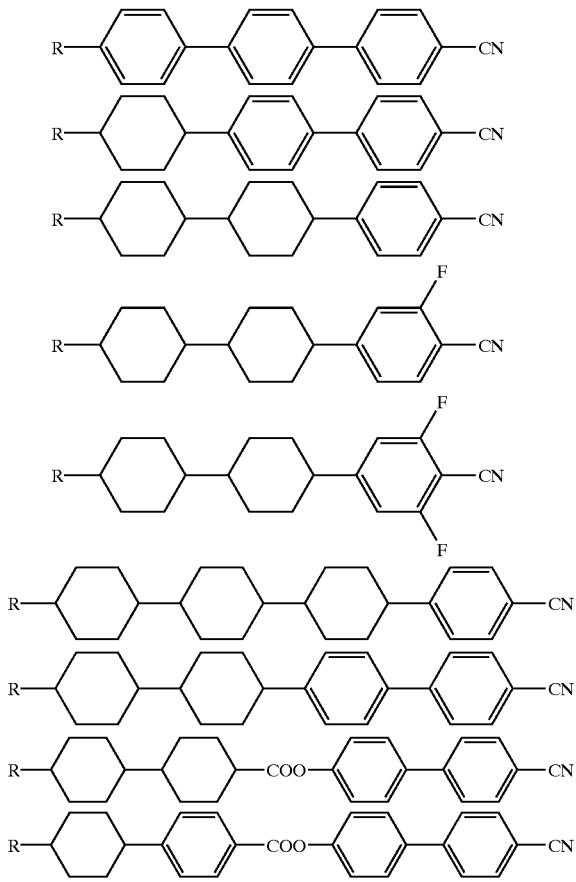

-continued

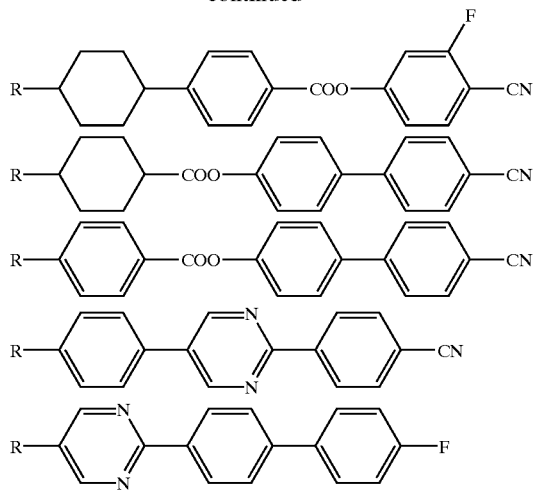

wherein R is an alkyl group or an alkoxy group having 1 to 10 carbon atoms, or an alkoxymethyl group or an alkenyl group having 2 to 10 carbon atoms.

The functions of the component compounds which constitute the liquid crystal composition of the present invention will be explained.

The compound represented by the general formula (1) which is the first component of the present invention has the characteristics that the dielectric anisotropy is large, a change rate of the dielectric anisotropy to a temperature change is almost the same as a change rate of an elastic constant to a temperature change, and stability to heat and ultraviolet rays is very high. Accordingly, the compound represented by the general formula (1) exhibits the functions of maintaining the high stability of the liquid crystal composition to heat and ultraviolet rays, lowering the threshold voltage, reducing the temperature dependency at the threshold voltage, and further improving the frequency dependency of the dielectric anisotropy ($\Delta\epsilon$) at a low temperature.

The compound represented by the general formula (2-1) which is the second component of the present invention has the characteristics that the dielectric anisotropy is substantially zero and the viscosity is low. In the present invention, therefore, the compound represented by the general formula (2-1) is used for the purposes of lowering the viscosity of the liquid crystal composition and simultaneously adjusting the threshold voltage of the liquid crystal composition. The compound represented by the general formula (2-2) has the characteristics that the dielectric anisotropy is substantially zero or a small positive value, the clearing point is high, and the viscosity is low. Consequently, the compound represented by the general formula (2-2) in the present invention plays the roles of increasing the clearing point of the liquid crystal composition, simultaneously lowering the viscosity, and adjusting the threshold voltage. The compound represented by the general formula (2-3) has the characteristics that the dielectric anisotropy is substantially zero, the clearing point is high, the viscosity is low, and the optical anisotropy is large. Accordingly, the compound represented by the general formula (2-3) in the present invention is used for the purposes of increasing the clearing point of the liquid crystal composition, simultaneously lowering the viscosity, and further adjusting the optical anisotropy and the threshold voltage of the liquid crystal composition. The compound represented by the general formula (2-4) has the characteristics that the dielectric anisotropy is substantially zero and the clearing point is particularly high. Consequently, the compound represented by the general formula (2-4) in the present invention is used for the purposes of further increasing the clearing point of the liquid crystal composition and adjusting the threshold voltage.

The compound represented by the general formula (3) which is the third component of the present invention has a dielectric anisotropy value substantially equal to or smaller than that of the compound represented by the general formula (1) of the present invention. Therefore, the compound represented by the general formula (3) of the present invention is used for the purpose of further lowering the threshold voltage of the liquid crystal composition.

The significance of the present invention is to attain the liquid crystal composition which satisfies general properties required for conventional STN display materials and which simultaneously particularly exhibits a low threshold voltage, a reduced temperature dependency at the threshold voltage, a high stability to heat and ultraviolet rays, and further an improved frequency dependency of the dielectric anisotropy ($\Delta\epsilon$) at a low temperature. Particularly, in order to improve the frequency dependency of the dielectric anisotropy at a low temperature, the present invention is characterized by constituting the composition by using a p-type component alone having two six-membered rings and by excluding all the P-type components each consisting of three or more six-membered rings (the $\Delta\epsilon$ is positive and large) which have a bad influence on the frequency dependency.

Each of the compounds which constitute the liquid crystal composition of the present invention can be prepared in accordance with such a prior art as described hereinafter or by referring to this art.

Among the compounds represented by the general formula (1), for example, the compounds represented by the general formulas (1-3) and (1-9) can be prepared by synthetic methods described in WO 96/11897 and Japanese Patent Application No. 72708/1997, respectively. The other compounds of the formula (1) can also be prepared by referring to these described methods.

Among the compounds represented by the general formulas (2-1) and (2-2), for example, the compounds represented by the general formulas (2-1-2) and (2-2-2) can be prepared by a synthetic method described in Japanese Patent Application Laid-Open No. 308239/1989. Among the compounds represented by the general formula (2-3), for example, the compound represented by the general formula (2-3-1) can be prepared by a synthetic method described in Japanese Patent Application Laid-Open No. 152334/1988. Among the compounds represented by the general formula (2-4), for example, the compound represented by the general formula (2-4-2) can be prepared by a synthetic method described in Japanese Patent Application Laid-Open No. 237949/1990.

Among the compounds represented by the general formula (3), for example, the compounds of the general formulas (3-2) and (3-7) can be prepared by synthetic methods described in Japanese Patent Application Laid-Open Nos. 176240/1984 and 300861/1992, respectively.

In the liquid crystal composition of the present invention, a small amount of a liquid crystal compound which is not a liquid crystal compound having a dielectric anisotropy value ($\Delta\epsilon$) of 5 or more and possessing three or more six-membered rings may be used by mixing in addition to the first, second and third components, so long as the objects of the present invention are not impaired. The liquid crystal composition itself of the present invention is prepared by a conventional method. In general, there is utilized a method which comprises mixing various component compounds, and then dissolving the mixture at a high temperature. In the liquid crystal composition of the present invention, a chiral dopant may be used by adding in order to induce the helical structure of a liquid crystal molecule and to thereby obtain a necessary twist angle.

Furthermore, the liquid crystal composition of the present invention can be used as the liquid crystal composition of a guest-host mode by adding a dichroic pigment of a mellocyanine series, a styryl series, an azo series, an azomethine series, an azoxy series, a quinophthalone series, an anthraquinone series or a tetrazine series, and it can also be used as the liquid crystal composition for a polymer dispersion type liquid crystal display element, a birefringence control mode or a dynamic scattering mode.

The present invention provides a liquid crystal composition which satisfies general properties required for STN mode and which simultaneously especially exhibits a low threshold voltage, a small temperature dependency thereat, a high stability to heat and ultraviolet rays, and a small frequency dependency of a dielectric anisotropy ($\Delta\epsilon$) at a low temperature, i.e., a constant value of $\Delta\epsilon$ up to a higher frequency range

EXAMPLES

The present invention will be described in detail by way of examples, but it should not-be limited to these examples. All of mixing ratios of components shown in the examples and comparative examples are based on % by weight. Compounds used in the examples and the comparative examples are designated by symbols defined in Table 1.

The characteristics of the liquid crystal composition are designated by an upper limit temperature $T_{NI}$ of a nematic liquid crystal phase, a lower limit temperature $T_c$ of the nematic liquid crystal phase, a viscosity $\eta$, an optical anisotropy $\Delta n$, a threshold voltage $V_{th}$, a temperature dependency $\delta$ of the threshold voltage, a stability dH to heat, a stability dUV to ultraviolet rays, a steepness $\gamma$, a frequency dependency $F_{10}$ of the dielectric anisotropy ($\Delta\epsilon$).

TABLE 1

$R-(A_1)-Z_1 \ldots Z_n-(A_n)-X$

| 1) Left terminal Group R— | Symbol |
|---|---|
| $C_nH_{2n+1}$— | n— |
| $C_nH_{2n+1}CH=CHC_mH_{2m}$— | nVm— |
| $C_nH_{2n+1}OC_mH_{2m}$— | nOm— |
| $CH_2=CHC_nH_{2n}$— | Vn— |
| $CH_2=CH$— | V— |
| $CF_2=CH$— | VFF— |
| $CF_2=CHC_nH_{2n}$— | VFFn— |

| 2) Bonding group —$Z_1$—, —$Z_n$— | Symbol |
|---|---|
| —$C_2H_4$— | 2 |
| —COO— | E |
| —C≡C— | T |
| —$CF_2O$— | CF2O |

| 3) Ring structure —(A1)—, —(An)— | Symbol |
|---|---|
| 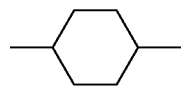 | H |
| 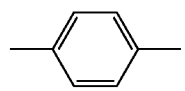 | B |

TABLE 1-continued

R—(A₁)—Z₁ ... Zₙ—(Aₙ)—X

| Structure | Symbol |
|---|---|
| (phenyl with F) | B(F) |
| (phenyl with F,F) | B(F,F) |
| (pyrimidine) | Py |

| 4) Right terminal group —X | Symbol |
|---|---|
| —CN | —C |
| —OCₙH₂ₙ₊₁ | —On |
| —F | —F |
| —CₙH₂ₙ₊₁ | —n |
| —CH═CF₂ | —VFF |

5) Notation example

Example 1

3-BCF2OB(F,F)—C

C₃H₇—⟨phenyl⟩—CF₂O—⟨phenyl with F,F⟩—CN

Example 2

VFF2—HHB-1

CF₂═CHC₂H₄—⟨cyclohexyl⟩—⟨cyclohexyl⟩—⟨phenyl⟩—CH₃

The upper limit temperature $T_{NI}$ of the nematic liquid crystal phase was determined by observing a state at a time when the nematic phase changed to an isotropic liquid phase during a temperature rise step by the use of a polarizing microscope, and then measuring a temperature at this time.

The lower limit temperature $T_c$ of the nematic liquid crystal phase was judged on the basis of a temperature of a freezer at which crystals or the smectic phase appeared when the liquid crystal compositions were allowed to stand for 30 days in freezers kept at 0° C., −10° C., −20° C., −30° C. and −40° C. For example, in the case that one liquid crystal composition became the nematic phase at −20° C. and crystallized or became the smectic phase at −30° C., the $T_c$ of this liquid crystal composition was represented by <−20° C.

The viscosity η was measured at 20° C. by the use of an E-type rotary viscometer.

The optical anisotropy Δn was measured at 25° C. by the use of a light source lamp having a wavelength of 589 nm and an Abbe's refractometer.

The threshold voltage $V_{th}$ was determined on the basis of a V-T curve measured at 25° C.

The temperature dependency δ of the threshold voltage was determined by measuring $V_{th}$'s at 20° C. and 50° C., and then calculating the following equation (a). It is meant that the smaller the δ value is, the smaller the temperature dependency of threshold voltage is.

$$\delta(V/°C.)=[V_{th20}(V)-V_{th50}(V)]/[50°C.-20°C.] \quad (a)$$

In the equation (a), $V_{th50}$ and $V_{th20}$ denote the $V_{th}$'s at 50° C. and 20° C., respectively. Each of the $V_{th}$'s at 20° C., 25° C. and 50° C. is a voltage value which is applied at a time when a transmittance of a light passing through a cell has become 90%, in the case that a rectangular wave having a frequency of 32 Hz is applied at a normally white mode by the use of the cell having a thickness of 9.0 μm and a twist angle of 80°.

The stability dH to heat was determined in accordance with the following equation (b). It is meant that the smaller the dH is, the higher the stability to heat is.

$$dH(\mu A)=I_{ha}(\mu A)-I_{hb}(\mu A) \quad (b)$$

In the equation (b), $I_{ha}$ denotes an electric current value of the liquid crystal composition after heating, and $I_{hb}$ denotes an electric current value of the liquid crystal composition before the heating. The heating of the liquid crystal composition was carried out in the air at 150° C. for 1 hour. The electric current value was determined by arranging glass plates so as to face each other on which silicon dioxide was obliquely deposited to form a TN cell having a cell thickness of 10 μm and an electrode area of 1 cm², filling this cell with the liquid crystal composition for evaluation to prepare a cell for the evaluation of the liquid crystal composition, and then applying a rectangular wave of 3V and 32 Hz to this cell. The electric current value was measured at 25° C.

The stability dUV to ultraviolet rays was determined in accordance with the following equation (c). It is meant that the smaller the dUV is, the higher the stability to ultraviolet rays is.

$$dUV(\mu A)=I_{uva}(\mu A)-I_{uvb}(\mu A) \quad (c)$$

In the equation (c), $I_{uva}$ denotes an electric current value of the liquid crystal composition after ultraviolet irradiation, and $I_{uvb}$ denotes an electric current value of the liquid crystal composition before the ultraviolet irradiation. In this regard, the irradiation of the liquid crystal composition with the ultraviolet was carried out by filling a cell for evaluation (the same as referred to hereinbefore) with the liquid crystal composition, and then irradiating this cell with ultraviolet rays emitted from an ultra-high pressure mercury lamp (manufactured by Ushio Electric Co. Ltd.) having an energy of 12 mW/cm² for 20 minutes (a distance between the light source and the object to be irradiated was 20 cm). The electric current value was measured in the same manner as mentioned above.

The steepness γ was determined in accordance with the following equation (d). It is meant that the closer to 1 the γ value is, the higher the steepness is.

$$\gamma=V_{20}/V_{80} \quad (d)$$

In the equation (d), $V_{20}$ and $V_{80}$ denote voltage values which are applied at a time when transmittances of a light passing through the cell at a normally yellow mode have become 20% and 80%, respectively. The measurement of $V_{20}$ and $V_{80}$ was carried out using a cell having a twist angle of 240° and a cell thickness of (0.80/Δn) μm, and applying a rectangular wave having a frequency of 70 Hz at 25° C. to the cell. The liquid crystal composition used in this measurement was prepared by adding cholesteryl nonanoate as a chiral dopant to 100 parts of the liquid crystal composition so that a ratio (d/P) of a cell thickness d to a pitch length P might be 0.50.

The frequency dependency $F_{10}$ of the dielectric anisotropy (Δε) was determined as a frequency at which a Δε value reduced by 10% to the Δε value at a low frequency (100 Hz). The measurement was carried out at −20° C. to inspect the frequency dependency of the AC in a low temperature range.

As shown in FIG. 1, the dielectric anisotropy (Δε) decreases on the side of a high frequency. The large $F_{10}$ value means that the frequency dependency is low, that is, the constant Δε value can be obtained up to a higher frequency range, which means that the frequency dependency is excellent.

Example 1

A liquid crystal composition was prepared using the following compound selected from the general formula (1) as the first component:

3—BCF2OB (F, F)—C18% and the following compounds selected from the general

| 3-HH-4 | 10% |
| 3-HB—O2 | 18% |
| 3-HHB-1 | 10% |
| 3-HHB-3 | 10% |
| 3-HB(F)TB-2 | 6% |
| 3-HB(F)TB-3 | 6% |
| 3-HB(F)B-4 | 6% |
| 3-H2BTB-2 | 6% |
| 3-H2BTB-3 | 6% |
| 3-H2BTB-4 | 5% |

The characteristics of the above composition were as follows:

| $T_{NI}$ | = | 89.4° C. |
| $T_c$ | < | −30° C. |
| η | = | 15.6 mPa · s |
| Δn | = | 0.143 |
| $V_{th}$ | = | 2.41 V |
| δ | = | 0.002 V/° C. |
| dH | = | 0.03 μA |
| dUV | = | 0.04 μA |
| γ | = | 1.045 |
| $F_{10}$ | = | 19000 Hz |

This composition has an excellent steepness, a small temperature dependency of threshold voltage, and a high stability to heat and ultraviolet rays. In addition, it has a large $F_{10}$ value and a small frequency dependency of a dielectric anisotropy (Δε) at a low temperature, i.e., it can obtain a constant Δε value up to a higher frequency range, which means that the composition is excellent in the frequency dependency.

Example 2

A liquid crystal composition was prepared using the following compounds selected from the general formula (1) as the first component:

2—B (F) CF2OB (F)—C4%
3—B (F) CF2OB (F)—C5%
4—B (F) CF2OB (F)—C4%
5—B (F) CF2OB (F)—C4% and the following compounds selected from the general formulas (2-1) to (2-4) as the second component:

| 3-HH-4 | 7% |
| 3-HB—O2 | 19% |
| 3-HHB-1 | 10% |
| 3-HHB-3 | 13% |
| 3-HB(F)TB-2 | 6% |
| 3-HB(F)TB-3 | 6% |
| 3-HB(F)TB-4 | 6% |
| 3-H2BTB-2 | 6% |
| 3-H2BTB-3 | 5% |
| 3-H2BTB-4 | 5% |

The characteristics of the above composition are as follows:

| $T_{NI}$ | = | 95.8° C. |
| $T_c$ | < | −20° C. |
| η | = | 14.8 mPa · s |
| Δn | = | 0.142 |
| $V_{th}$ | = | 2.43 V |
| δ | = | 0.003 V/° C. |
| dH | = | 0.03 μA |
| dUV | = | 0.04 μA |
| γ | = | 1.037 |
| $F_{10}$ | = | 17500 Hz |

Example 3

A liquid crystal composition was prepared using the following compounds selected from the general formula (1) as the first component:

2—BCF2OB (F, F)—C5%
3—BCF2OB (F, F)—C5%
5—BCF2OB (F, F)—C5% the following compounds selected from the general formulas (2-1) to (2-4) as the second component:

| 3-HHB-1 | 9% |
| 3-HHB-3 | 10% |
| VFF2—HHB-1 | 20% |
| 3-HB(F)TB-2 | 6% |
| 3-H2BTB-2 | 5% |
| 3-H2BTB-3 | 5% |
| 1O1-HBBH-5 | 5% | and the following compounds selected from the general formula (3) as the third component:

| 3O1—BEB(F)—C | 5% |
| 3-HB(F)—C | 20% |

The characteristics of the above composition are as follows:

| $T_{NI}$ | = | 895° C. |
| $T_c$ | < | −30° C. |

| | | |
|---|---|---|
| | -continued | |
| η | = | 23.2 mPa · s |
| Δn | = | 0.131 |
| $V_{th}$ | = | 1.52 V |
| δ | = | 0.002 V/° C. |
| dH | = | 0.03 μA |
| dUV | = | 0.04 μA |
| γ | = | 1.048 |
| $F_{10}$ | = | 7300 Hz |

Example 4

A liquid crystal composition was prepared using the following compounds selected from the general formula (1) as the first component:

| | |
|---|---|
| 2-B(F,F)CF2OB(F)—C | 5% |
| 3-B(F,F)CF2OB(F)—C | 5% |
| V2—B(F,F)CF2OB(F)—C | 5% | the following compounds selected from the general formulas (2-1) to (2-4) as the second component:

| | |
|---|---|
| 3-HHB-1 | 5% |
| VFF—HHB-1 | 8% |
| VFF2—HHB-1 | 20% |
| 3-HB(F)TB-2 | 6% |
| 3-HB(F)TB-3 | 6% |
| 3-H2BTB-2 | 5% |
| 3-H2BTB-3 | 5% |
| 1O1—HBBH-5 | 5% | and the following compounds selected from the general formula (3) as the third component:

| | |
|---|---|
| 2-BEB(F)—C | 5% |
| 3-HB(F)—C | 20% |

The characteristics of the above composition are as follows:

| | | |
|---|---|---|
| $T_{NI}$ | = | 90.7° C. |
| $T_c$ | < | −30° C. |
| η | = | 24.6 mPa · s |
| Δn | = | 0.138 |
| $V_{th}$ | = | 1.54 V |
| δ | = | 0.003 V/° C. |
| dH | = | 0.04 μA |
| dUV | = | 0.04 μA |
| γ | = | 1.046 |
| $F_{10}$ | = | 6550 Hz |

Example 5

A liquid crystal composition was prepared using the following compounds selected from the general formula (1) as the first component:

| | |
|---|---|
| 3-BCF2OB—C | 5% |
| 3-BCF2OB(F)—C | 5% |
| 3-B(F,F)CF2OB—C | 5% | the following compounds selected from the general formulas (2-1) to (2-4) as the second component:

| | |
|---|---|
| 3-HHB-1 | 5% |
| VFF—HHB-1 | 8% |
| VFF2—HHB-1 | 20% |
| 3-HB(F)TB-2 | 6% |
| 3-HB(F)TB-3 | 6% |
| 3-H2BTB-2 | 5% |
| 3-H2BTB-3 | 5% |
| 1O1—HBBH-5 | 5% | and the following compounds selected from the general formula (3) as the third component:

| | |
|---|---|
| 2-B(F)EB(F)—C | 5% |
| 3-HB(F)—C | 20% |

The characteristics of the above composition are as follows:

| | | |
|---|---|---|
| $T_{NI}$ | = | 94.5° C. |
| $T_c$ | < | −30° C. |
| η | = | 22.4 mPa · s |
| Δn | = | 0.143 |
| $V_{th}$ | = | 1.58 V |
| δ | = | 0.004 V/° C. |
| dH | = | 0.04 μA |
| dUV | = | 0.04 μA |
| γ | = | 1.039 |
| $F_{10}$ | = | 6850 Hz |

Example 6

A liquid crystal composition was prepared by using the following compounds selected from the general formula (1) as the first component:

| | |
|---|---|
| 3-BCF2OB (F, F)—C | 5% |
| 3-B (F) CF2OB (F, F)—C | 5% |
| 3-B (F, F) CF2OB (F, F)—C | 5% | the following compounds selected from the general formulas (2-1) to (2-4) as the second component:

| | |
|---|---|
| 5-HH—VFF | 10% |
| 3-HHB-1 | 5% |
| VFF—HHB-1 | 8% |
| VFF2-HHB-1 | 20% |
| 3-HB (F) TB-2 | 6% |
| 3-HB (F) TB-3 | 6% |

-continued

| | |
|---|---|
| 3-H2BTB-2 | 5% |
| 3-H2BTB-3 | 5% |
| 1O1-HBBH-5 | 5% | and the following compounds selected from the general formula (3) as the third component:

| | |
|---|---|
| 1V2-BEB (F, F)—C | 5% |
| 3-HB (F)—C | 10% |

The characteristics of the above composition are as follows:

$T_{NI} = 90.2°$ C.
$T_c < -30°$ C.
$\eta = 20.8$ mPa·s
$\Delta n = 0.132$
$V_{th} = 1.49$ V
$\delta = 0.001$ V/° C.
$dH = 0.12$ μA
$dUV = 0.18$ μA
$\gamma = 1.048$
$F_{10} = 8500$ Hz

Example 7

A liquid crystal composition was prepared by using the following compound selected from the general formula (1) as a first component:

3—BCF2OB (F,F)—C 10% the following compounds selected from the general formulas (2-1) to (2-4) as the second component:

| | |
|---|---|
| 3-HHB-1 | 5% |
| 3-HHB-3 | 6% |
| VFF—HHB-1 | 10% |
| VFF2-HHB-1 | 20% |
| 3-HB (F) TB-2 | 5% |
| 3-H2BTB-2 | 5% |
| 3-H2BTB-3 | 5% |
| 1O1-HBBH-5 | 6% | and the following compounds selected from the general formula (3) as the third component:

| | |
|---|---|
| 3-HB (F, F)—C | 10% |
| 3-HB (F)—C | 18% |

The characteristics of the above composition are as follows:

$T_{NI} = 88.7°$ C.
$T_c < -30°$ C.
$\eta = 22.5$ mPa·s
$\Delta n = 0.130$
$V_{th} = 1.56$ V
$\delta = 0.002$ V/° C.
$dH = 0.03$ μA
$dUV = 0.03$ μA
$\gamma = 1.047$
$F_{10} = 8750$ Hz The compositions obtained in the above examples have an excellent steepness, a small temperature dependency at a threshold voltage, and a high stability to heat and ultraviolet rays. In addition, they have a large $F_{10}$ value and a small frequency dependency of a dielectric anisotropy ($\Delta\epsilon$) at a low temperature, that is, they can obtain the constant $\Delta\epsilon$ value up to a higher frequency range, which means that they are excellent in the frequency dependency.

Comparative Example 1

The following composition of Composition Example 19 in WO 96/11897 was prepared as a composition similar to the composition of the present invention:

| | |
|---|---|
| 3-HBCF2OB (F, F)—C | 6% |
| 5-HBCF2OB (F, F)—C | 6% |
| 3-HB (F, F) CF2OB—C | 6% |
| 5-HB (F, F) CF2OB—C | 6% |
| 2O1-BEB (F)—C | 2% |
| 3O1-BEB (F)—C | 8% |
| 2-HB (F)—C | 5% |
| 3-HB (F)—C | 7% |
| 3-HHB (F)—C | 3% |
| 2-HHB (F)—F | 5% |
| 3-HHB (F)—F | 5% |
| 5-HHB (F)—F | 5% |
| 3-H2BTB-2 | 4% |
| 3-H2BTB-3 | 4% |
| 3-H2BTB-4 | 4% |
| 3-HB (F) TB-2 | 4% |
| 3-HB (F) TB-3 | 4% |
| 3-HB (F) TB-4 | 4% |
| 3-HHB-1 | 6% |
| 3-HHB-3 | 3% |
| 3-HHB—O1 | 3% |

The characteristics of the above composition are as follows:

$T_{NI} = 97.7°$ C.
$T_c < -20°$ C.
$\eta = 38.4$ mPa·s
$\Delta n = 0.141$
$V_{th} = 1.52$ V
$\delta = 0.013$ V/° C.
$dH = 0.05$ μA
$dUV = 0.10$ μA
$\gamma = 1.113$
$F_{10} = 950$ Hz The above composition has a $\gamma$ value of 1.113, and exhibits a large temperature dependency at a threshold voltage and a bad steepness. In addition, it has a $F_{10}$ value of 950 Hz which is smaller than the $F_{10}$ values of the compositions of the above examples, and a frequency dependency of a dielectric anisotropy ($\Delta\epsilon$) at a low temperature is large and hence bad.

Comparative Example 2

The following liquid crystal composition described in Example 46 of the specification of Japanese Patent Application Laid-Open No. 251186/1998 was prepared as a composition similar to the composition of the present invention:

| | | |
|---|---|---|
| 3-HBCF2OB (F, F)—C | 5% | |
| 3-BCF2OB (F, F)—C | 5% | |
| 3-H2B (F) CF2OB (F, F)—F | 5% | |
| 1V2-BEB (F, F)—C | 5% | |
| 3-HB—C | 20% | |
| 1-BTB-3 | 5% | |
| 2-BTB-1 | 10% | |
| 3-HH-4 | 11% | |
| 3-HHB-1 | 7% | |
| 3-HHB-3 | 9% | |
| 3-H2BTB-2 | 4% | |
| 3-H2BTB-3 | 4% | |
| 3-H2BTB-4 | 4% | |
| 3-HB (F) TB-2 | 6% | |

The characteristics of the above composition are as follows:

$T_{NI}$ = 74.7° C.
$T_c$ < −30° C.
$\eta$ = 15.2 mPa · s
$\Delta n$ = 0.146
$V_{th}$ = 1.67 V
$\delta$ = 0.018 V/° C.
dH = 0.15 $\mu$A
dUV = 0.31 $\mu$A
$\gamma$ = 1.114
$F_{10}$ = 2500 Hz This composition has a $\gamma$ value of 1.114, and exhibits a large temperature dependency of threshold voltage and a bad steepness. In addition, it has a small $F_{10}$ value of 2500 Hz, which means a bad frequency dependency of a dielectric anisotropy ($\Delta\epsilon$) at a low temperature.

Comparative Example 3

The following liquid crystal composition described in Example 49 of the specification of Japanese Patent Application Laid-Open No. 251186/1998 was prepared as a composition similar to the composition of the present invention:

| | | |
|---|---|---|
| 3-BCF2OB (F, F)—C | 5% | |
| V2-BCF2OB (F, F)—C | 5% | |
| 5-PyB—F | 4% | |
| 3-PyB (F)—F | 4% | |
| 2-BB—C | 5% | |
| 4-BB—C | 4% | |
| 5-BB—C | 5% | |
| 3-PyB-2 | 2% | |
| 6-PyB—O5 | 3% | |
| 6-PyB—O6 | 3% | |
| 3-PyBB—F | 6% | |
| 4-PyBB—F | 6% | |
| 5-PyBB—F | 6% | |
| 3-HHB-1 | 6% | |
| 3-HHB-3 | 8% | |
| 2-H2BTB-2 | 4% | |
| 2-H2BTB-3 | 4% | |
| 2-H2BTB-4 | 5% | |
| 3-H2BTB-2 | 5% | |
| 3-H2BTB-3 | 5% | |
| 3-H2BTB-4 | 5% | |

The characteristics of the above composition are as follows:

$T_{NI}$ = 82.7° C.
$T_c$ < −20° C.
$\eta$ = 33.6 mPa · s
$\Delta n$ = 0.193
$V_{th}$ = 1.82 V
$\delta$ = 0.024 V/° C.
dH = 0.24 $\mu$A
dUV = 0.45 $\mu$A
$\gamma$ = 1.203
$F_{10}$ = 800 Hz This composition has a $\gamma$ value of 1.203, and exhibits a large temperature dependency at a threshold voltage and a bad steepness. In addition, it has a small $F_{10}$ value of 800 Hz, which means a bad frequency dependency of a dielectric anisotropy ($\Delta\epsilon$) at a low temperature.

What is claimed is:

1. A liquid crystal composition comprising:

a first component comprising at least one compound selected from the group consisting of compounds represented by the general formulas (1-1), (1-2), (1-4), (1-5), (1-6), (1-7) and (1-8), and a second component comprising at least one compound selected from the group consisting of compounds represented by the general formulas (2-1), (2-2), (2-3) and (2-4), without any liquid crystalline compound having a dielectric anisotropy value ($\Delta\epsilon$) of 5 or more and three or more six-membered rings, as another component:

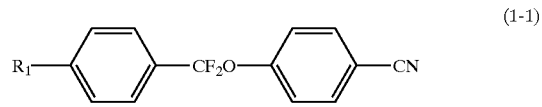
(1-1)

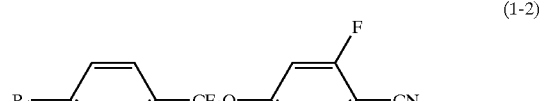
(1-2)

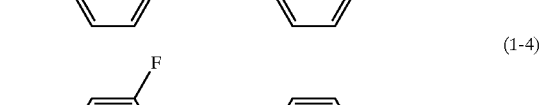
(1-4)

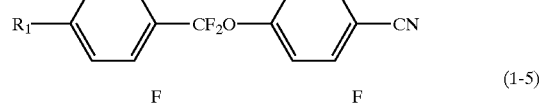
(1-5)

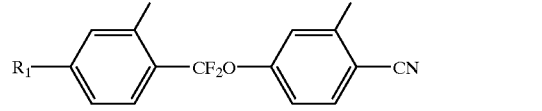
(1-6)

-continued

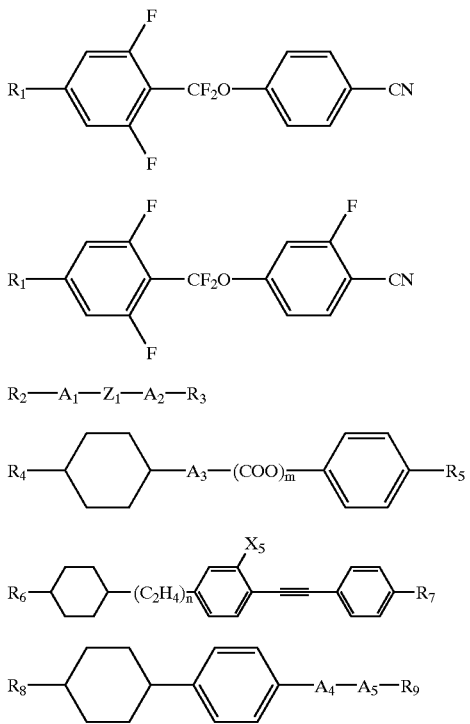

(1-7)

(1-8)

$R_2$—$A_1$—$Z_1$—$A_2$—$R_3$ (2-1)

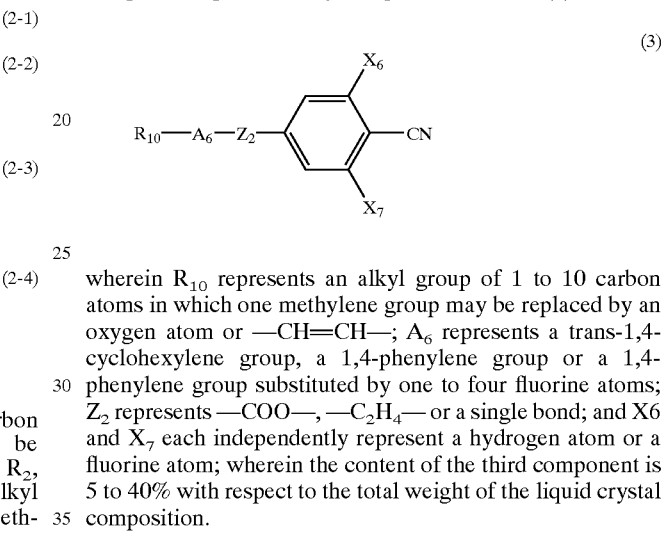

(2-2)

(2-3)

(2-4)

wherein $R_1$ represents an alkyl group of 1 to 10 carbon atoms in which one methylene group may be replaced by an oxygen atom or —CH=CH—; $R_2$, $R_3$ and $R_4$ each independently represent an alkyl group of 1 to 10 carbon atoms in which one methylene group may be replaced by an oxygen atom or —CH=CH— and one or more hydrogen atoms may be substituted by fluorine atoms; $R_5$ represents an alkyl group of 1 to 10 carbon atoms in which one methylene group may be replaced by an oxygen atom; $R_6$, $R_7$ and $R_9$ each independently represent an alkyl group of 1 to 10 carbon atoms; $R_8$ represents an alkyl group of 1 to 10 carbon atoms in which one methylene group may be replaced by an oxygen atom; $A_1$, $A_2$, $A_3$ and $A_5$ each independently represent a trans-1,4-cyclohexylene group or a 1,4-phenylene group; $A_4$ represents a 1,4-phenylene group or a 1,4-phenylene group substituted by one to four fluorine atoms; $Z_1$ represents —C≡C— or a single bond; and m and n each independently represent an integer of 0 or 1; wherein the contents of the first component and the second component are 5 to 50% and 10 to 85%, respectively, with respect to the total weight of the liquid crystal composition.

2. A liquid crystal composition according to claim 1, which further contains a third component comprising a compound represented by the general formula (3)

$$R_{10}\text{—}A_6\text{—}Z_2\text{—}\underset{X_7}{\overset{X_6}{\bigcirc}}\text{—CN} \quad (3)$$

wherein $R_{10}$ represents an alkyl group of 1 to 10 carbon atoms in which one methylene group may be replaced by an oxygen atom or —CH=CH—; $A_6$ represents a trans-1,4-cyclohexylene group, a 1,4-phenylene group or a 1,4-phenylene group substituted by one to four fluorine atoms; $Z_2$ represents —COO—, —$C_2H_4$— or a single bond; and X6 and $X_7$ each independently represent a hydrogen atom or a fluorine atom; wherein the content of the third component is 5 to 40% with respect to the total weight of the liquid crystal composition.

3. A liquid crystal display element comprising the liquid crystal composition according to claim 1.

4. A liquid crystal display element comprising the liquid crystal composition according to claim 2.

* * * * *

UNITED STATES PATENT AND TRADEMARK OFFICE
CERTIFICATE OF CORRECTION

PATENT NO.    : 6,500,502 B1                                              Page 1 of 1
DATED         : December 31, 2002
INVENTOR(S)   : Hiroaki Fujita et al.

It is certified that error appears in the above-identified patent and that said Letters Patent is hereby corrected as shown below:

<u>Column 24,</u>
Line 7, change "—C=C—" to -- —C≡C— --.
Line 31, change "X6" to -- $X_6$ --.

Signed and Sealed this

Fifth Day of August, 2003

JAMES E. ROGAN
*Director of the United States Patent and Trademark Office*